United States Patent [19]

Urlwin

[11] Patent Number: 5,356,160
[45] Date of Patent: Oct. 18, 1994

[54] COLLAPSIBLE, WHEELED, CHAIR FRAME ASSEMBLY, AND A WHEEL AND TRAY ASSEMBLY THEREFOR

[76] Inventor: Robert Urlwin, 9 Woody Ln., Sparta, N.J. 07871

[21] Appl. No.: 32,288

[22] Filed: Mar. 17, 1993

[51] Int. Cl.⁵ .............................................. B62B 1/12
[52] U.S. Cl. ..................................... 280/30; 280/645; 280/648; 280/47.18; 280/47.29; 297/129; 297/193
[58] Field of Search ...................... 280/30, 47.28, 654, 280/47.26, 47.25, 641, 645, 647, 648, 650, 652, 47.18, 47.24, 47.29, 47.17; 297/31, 129, 192, 193

[56] References Cited

U.S. PATENT DOCUMENTS

| | | | |
|---|---|---|---|
| 2,744,762 | 5/1956 | Kirk | 280/47.28 |
| 3,000,645 | 9/1961 | Schmidt | 280/504 X |
| 3,997,213 | 12/1976 | Smith | 280/30 X |
| 4,376,547 | 3/1983 | Dominko | 280/30 |
| 4,659,142 | 4/1987 | Kachinsky, Jr. | 280/47.25 X |
| 4,733,905 | 3/1988 | Buickerood et al. | 280/47.25 X |
| 5,193,842 | 3/1993 | Fontenot | 280/654 |

Primary Examiner—Mitchell J. Hill
Assistant Examiner—Michael Mar
Attorney, Agent, or Firm—Bernard J. Murphy

[57] ABSTRACT

An axle, supported in a pair of brackets, and having wheels mounted to ends thereof, also pivotably carries a utility tray thereon. The brackets are provided for bolting thereof to leg members of a chair frame, to wheel the frame. The chair frame is collapsible, and the tray can be folded-up, unobtrusively with the component parts of the chair frame, or disposed prominently therefrom for wheeled transport of supplies and/or articles. With the chair frame expanded, into its seating disposition, the tray assumes a position substantially parallel with the seat frame, and therebelow, and the wheels are elevated in non-load-bearing disposition.

9 Claims, 3 Drawing Sheets

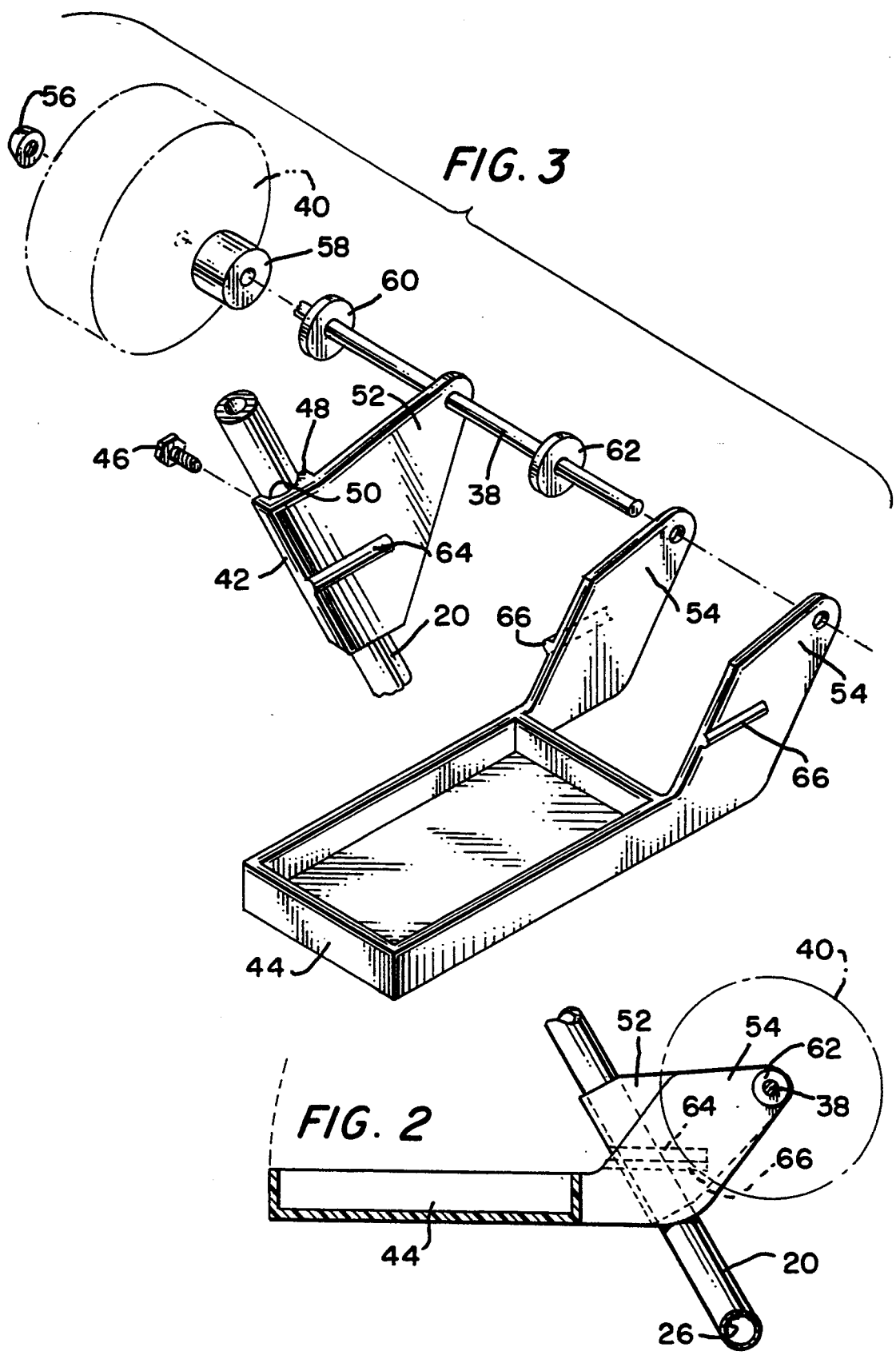

COLLAPSIBLE, WHEELED, CHAIR FRAME ASSEMBLY, AND A WHEEL AND TRAY ASSEMBLY THEREFOR

This invention pertains to so-called leisure furniture, and in particular to collapsible furniture such as beach chairs, chaises, and the like, which are wheeled to accommodate transport thereof to and from sites of use, and which have means for bearing and transporting articles thereon.

Furniture of the aforesaid type is known in the prior art, and exemplary thereof is the Combination Beach Caddy and Beach Chair, disclosed in U.S. Pat. No. 4,659,142 issued to Peter Kuchinsky, Jr., Apr. 21, 1987. Another Combination Chair and Cart is disclosed in the U.S. Pat. No. 4,733,905, issued on Mar. 29, 1988, to Kenneth N. Buickerood, et al. Further, William Q. Smith, et al, disclosed a Collapsible Carryall with Seat, in their U.S. Pat. No. 3,997,213, which issued on Dec. 14, 1976.

A limitation found in the aforesaid U.S. Pat. Nos. 4,659,142 and 4,733,905, is that the wheels thereof are always required to be load-bearing—when used as an articles transport, and when used as a chair. Rolling transport of articles is advantageous, but use of the wheels as load-bearing, ground support in a chair is deemed a less than satisfactory design. Such wheels would require heavy construction to support the weight of large persons. Too, there obtains the risk of the the wheel-grounded chair rolling off the edge of a sun deck or porch or the like, with an occupant. The Smith et al invention, desirably, has the wheels elevated, in non-load-bearing attitude when the chair configuration is employed. However, the arrangement does not accommodate a simple retrofit to conventional chair frames. It has side members which are cross braced at one end of each to form the front of a seat, and further have projecting extremities which must be modified to receive wheels. Conventional chair frame assemblies do not have such projecting extremities to which wheels can be mounted.

It is an object of this invention to set forth a novel, collapsible, wheeled, chair frame assembly which is not met with the aforesaid limitations. Too, it is an object of this invention to disclose a wheel and tray assembly designed for facile retrofit to conventional chair frame assemblies.

Particularly, it is an object of this invention to set forth a collapsible, wheeled, chair frame assembly, comprising a seat frame; front and rear leg members pivotably coupled to said seat frame; a back frame pivotably coupled to said rear leg members; and an assembly, removably coupled to said rear leg members, having at least one wheel and a utility tray; wherein said chair frame assembly comprises means, responsive to manipulation, for disposing said frame assembly in (a) a first, expanded, attitude, in which said wheel is in non-load-bearing elevation, and said tray assumes an attitude substantially parallel with said seat frame, and (b) a second, collapsed attitude, in which said seat frame, leg members, and back frame are folded together, into substantial parallelism as a compact unit, and said tray projects outwardly from and substantially perpendicular to said unit.

It is another object of this invention to disclose a collapsible, wheeled, chair frame assembly, comprising a seat frame; front and rear leg members pivotably coupled to said seat frame; a back frame pivotably coupled to said rear leg members; and an assembly, removably coupled to said rear leg members, having at least one wheel and a utility tray; wherein said chair frame assembly comprises means, responsive to manipulation, for disposing said frame assembly in (a) a first, expanded, attitude, in which said wheel is in non-load-bearing elevation, and said tray assumes an attitude substantially parallel with said seat frame, and (b) a second, collapsed attitude, in which said seat frame, leg members, back frame, and said tray are folded together, into substantial parallelism as a compact unit.

Yet another object of this invention is to set forth a wheel and tray assembly, for a collapsible chair frame assembly which has rear leg members, comprising a pair of brackets for fastening thereof to said rear leg members of said chair frame assembly; an axle supported in said brackets; at least one wheel mounted on said axle; and a utility tray rotatably mounted on said axle.

Further objects of this invention, as well as the novel features thereof, will become apparent by reference to the following description, taken in conjunction with the accompanying figures, in which:

FIG. 2 is an illustration, partly cross-sectioned, taken through the tray and axle of the wheel and tray assembly, showing the relationship of the tray and one of the brackets, with the wheel thereat depicted only in phantom;

FIG. 3 is an exploded, perspective view of the axle, tray, and one of the brackets, with one wheel in phantom, of the wheel and tray assembly.

Figure 1:
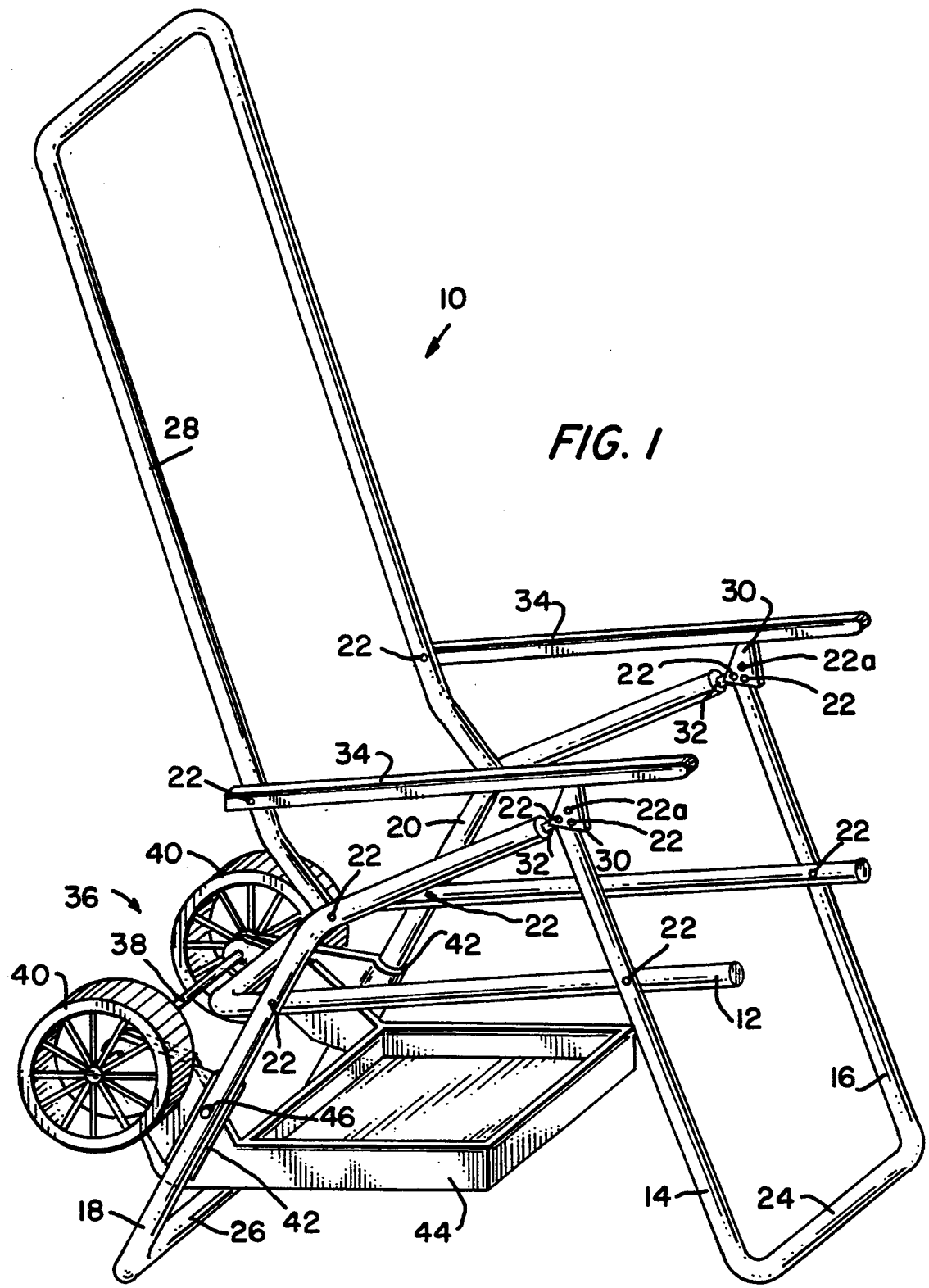
FIG. 1 is a perspective illustration of a collapsible beach chair frame which embodies the invention, the same having the retrofitted wheel and tray assembly fastened thereto.

As shown in the figures, the novel collapsible, wheeled, chair frame assembly 10 comprises a seat frame 12 of tubular, generally U-shaped conformation, with front leg members 14 and 16, and rear leg members 18 and 20, pivotably coupled to the seat frame 12 by pins 22. Front leg members 14 and 16 are joined together, at ends thereof, by an integral transverse limb 24, and rear leg members 18 and 20 are likewise joined together, by an integral transverse limb 26. Limb 24 and members 14 and 16 constitute a substantially U-shaped element in which members 14 and 16 comprise parallel limbs, and limb 26 and members 18 and 20 also constitute a substantially U-shaped element in which members 18 and 20 comprise parallel limbs. Another, generally U-shaped element 28, comprises a back frame; it is pivotably coupled to the rear leg members 18 and 20 by further pins 22 (only one of such pins being visible in FIG. 1). Ends of front leg members 14 and 16, and ends of rear leg members 18 and 20 are met in wrap-around brackets 30. Members 14 and 16 are directly pivot-pinned in the brackets, by further pins 22. Members 18 and 20, being tubular, each have slidable therewithin, at the ends thereof, a telescoping tube 32. Tubes 32 are linearly pinned in the brackets 30 by pins 22 and 22a. Side arms 34 are pivotably coupled at first ends thereof to back frame element 28, and are slidably engaged with the brackets 30 by means of a metal band (not shown) which underlies the arms 34.

The functioning of the telescoping tube 32 and the cooperation of the same with the unshown metal band and the brackets 30, are such as to accommodate an adjustable inclination of the back frame element 28. However, explanation thereof is not detailed here, as the same is not germane to the invention. Such is already well known to those skilled in this art, and an exemplary embodiment thereof is the Hot Shot beach chair, style 771, marketed by Telescope Casual Furniture, Inc. of Granville, N.Y.

An assembly 36, comprising an axle 38, wheels 40, mounting brackets 42 and a utility tray 44 is secured to rear leg members 18 and 20 by bolts 46 (only one of which bolts is shown).

Each bracket 42 comprises a rib 48 with an arcuate cove 50 formed therein in which to nest one of the rear leg members 18 or 20, and has a threaded bore formed therein (not shown) in which to receive a bolt 46. One has only to form bolt holes in the leg members 18 and 20 to accommodate the bolts 46, to retrofit the assembly 36 to a chair frame. Each bracket 42 has an extending, triangular, bored web 52 through which to accommodate the axle 38. Too, the utility tray 44 has a pair of extending wings 54, which are also bored, to pivotably mount the tray 44 onto the axle 38. The wheels 40 are secured to ends of the axle 38 by cap nuts 56 (only one of which is shown). Spacers 58 (only one being shown) and a washer 60, mounted on the axle 38, are interposed between the wheels 40 and the webs 52. Too, washers 62 are interpositioned, on the axle 38, between the wings 54 and the webs 52.

Figure 4:
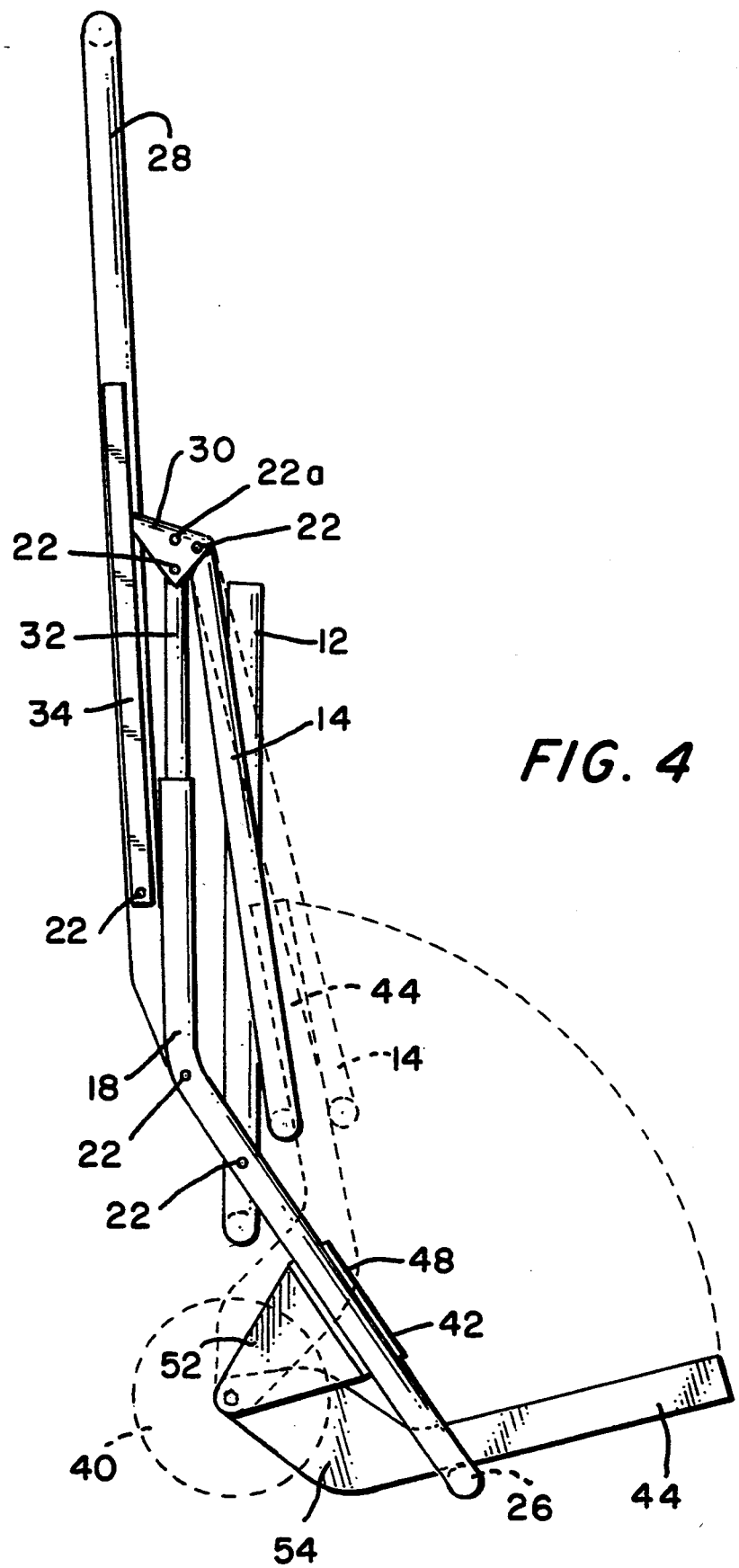
FIG. 4 is a side, elevational view of the novel chair frame assembly collapsed with the tray, in full line illustration, disposed for receipt of articles for transport, and with the tray also in dashed line illustration in a stored disposition.

Webs 52 and wings 54 have mutually confronting surfaces, and the former each have a prominent, rounded projection 64 formed thereacross, whereas the latter each have a prominent, rounded projection 66 formed thereacross. When the chair frame assembly 10 is in the attitude shown in FIG. 1, i.e., in its expanded attitude, projections 66 align with, and set atop the projections 64. Consequently, the tray 44 assumes the disposition shown, that is, in substantial parallelism with the seat frame 12, and raised over limb 26. Projections 64 and 66 comprise detenting means for maintaining the tray in the aforesaid disposition. When the chair frame assembly 10 is collapsed, as shown in FIG. 4, the tray 44 can be disposed as shown in full line illustration for ready receipt of articles for wheeled transport thereof. One has only to apply pressure to the outermost portion of the tray 44, and the projections 66 will ride over the projections 64, and dispose the tray as shown; in this attitude the tray lies upon limb 26 for reinforcement.

When one wants to store the chair frame assembly 10 unobtrusively, the tray 44 can be returned to its detented disposition and brought into substantial parallelism with the seat frame 12, leg members 14, 16, 18 and 20, back frame 28, and arms 34. Upon collapsing the frame assembly 10, one has only to interrupt the procedure, swing the tray 44 in under the transverse limb 24, and then continue collapsing the assembly 10 into the folded-up, compact unit shown in FIG. 4, where the tray 44, shown in dashed-line illustration, is held between the limb 24 and the seat frame 12, and the projections 66 are above the projections 64 again. With the assembly 10 folded-up, compactly, as shown in FIG. 4, it is free-standing. The disposition of the wheels 40 is such as to cooperate with the rest of the assembly 10 to permit the assembly to stand erect, unsupported. This is so, whether the tray 44 is outwardly projected, as shown in full line depiction in FIG. 4, or swung up, folded into the rest of the assembly 10, as shown in dashed-line illustration in FIG. 4. In the latter attitude, this free-standing feature is of significant import when it is desired to store the assembly 10, or to accommodate the assembly in display space in a retail store. Numbers of the assemblies 10 can be fitted into a limited display space, an advantage much appreciated by retailers. Too, the compact, folded-up assembly 10 has a minimal depth (i.e., front-to-back) dimension which greatly facilitates warehousing thereof as well as packaging thereof for shipping.

While not shown, in order that all the couplings of the frame assembly 10 can be clearly viewed, the frame assembly 10 will have webbing or fabric or wooden slats secured across the seat frame 12 and the back frame element 28 in a production configuration. However, such is not pertinent to the invention and it is for that reason that such seating and back support materials are omitted.

It is especially to be appreciated that retrofit of the assembly 36 to a conventional chair frame or chair, such as the aforecited beach chair by Telescope Casual Furniture, Inc., requires the formation of only two bolt holes, one in each of said leg members 18 and 20. In the "seating" disposition of the frame assembly 10, as shown in FIG. 1, the tray 44 is conveniently maintained therebelow for holding towels, sun screen ointment, sun glasses, etc. In this chair or "seating" disposition, the assembly 10 sets securely on limbs 24 and 26, with the wheels 40 elevated in non-load-bearing attitude. In the collapsed conformation, as shown in FIG. 4, the tray 44, electively, can be in projection, and prominently, for facile wheeling of articles and supplies to a chosen site, or can be folded up into the compact unit for storage.

While I have described my novel chair frame assembly and my retrofittable wheel and tray assembly in connection with specific embodiments thereof it is to be clearly understood that this is done only by way of example, and not as a limitation to the scope of my invention, as set forth in the objects thereof and in the appended claims.

I claim:

1. A collapsible, wheeled, chair frame assembly, comprising:

a seat frame;

front and rear leg members pivotably coupled to said seat frame;

a back frame pivotably coupled to said rear leg members; and an assembly, removably coupled to said rear leg members, having at least one wheel, support means for supporting said at least one wheel to said rear leg members for rotation about an axis rearwardly spaced from said rear leg members, and a utility tray secured to said support means for rotation about said axis; wherein said chair frame assembly comprises means, responsive to manipulation, for disposing said frame assembly in (a) a first, expanded, attitude, in which said wheel is in non-load-bearing elevation, and said tray assumes an attitude substantially parallel with said seat frame, and (b) a second, collapsed attitude, in which said seat frame, leg members, and back frame are folded together, into substantial parallelism as a compact unit, and said tray projects outwardly from, and substantially perpendicular to, said unit.

2. A collapsible, wheeled, chair frame assembly, according to claim 1, wherein:

said rear leg members comprise a pair of parallel limbs joined at ends thereof by an integral, transverse limb into a substantially U-shaped element; and said tray, when said chair frame assembly is in said second attitude, reposes upon said transverse limb.

3. A collapsible, wheeled, chair frame assembly, according to claim 2, wherein:

said transverse limb and said at least one wheel comprise means cooperative for causing said chair frame assembly to be unsupportedly free-standing when in said second, collapsed attitude.

4. A collapsible, wheeled, chair frame assembly, comprising:

a seat frame;

front and rear leg members pivotably coupled to said seat frame;

a back frame pivotably coupled to said rear leg members; and an assembly, removably coupled to said rear leg members, having at least one wheel, support means for supporting said at least one wheel to said rear leg members for rotation about an axis rearwardly spaced from said rear leg members, and a utility tray secured to said support means for rotation about said axis; wherein said chair frame assembly comprises means, responsive to manipulation, for disposing said frame assembly in (a) a first, expanded, attitude, in which said wheel is in non-load-bearing elevation, and said tray assumes an attitude, substantially parallel with said seat frame, and (b) a second, collapsed attitude, in which said seat frame, leg members, back frame, and said tray are folded together, into substantial parallelism as a compact unit.

5. A collapsible, wheeled, chair frame assembly, according to claim 4, wherein said support means comprises an axle, two wheels journalled onto opposite ends of said axle, a pair of mounting brackets rotatably mounted to said axle intermediate said wheels, and wherein said tray is rotatably mounted to said axle intermediate said mounting brackets.

6. A collapsible, wheeled, chair frame assembly, according to claim 4, wherein:

said rear leg members comprise a pair of parallel limbs joined at ends thereof by an integral, transverse limb into a substantially U-shaped element; and said transverse limb and said at least one wheel comprise means cooperative for causing said chair frame assembly to be unsupportedly free-standing when in said second, collapsed attitude.

7. A wheel and tray assembly, for a collapsible chair frame assembly having a seat frame, a back frame, and front and rear leg members, comprising:

a pair of brackets for fastening thereof to said rear leg members of said chair frame assembly;

an axle supported in said brackets;

at least one wheel mounted on said axle; and a utility tray mounted only on said axle for free and independent rotation thereon; wherein said chair frame asembly comprises means, responsive to manipulation for disposing said frame assembly in (a) a first, expanded attitude, in which said wheel is in non-load-bearing elevation, and said tray assumes an attitude substantially parallel with said seat frame, and (b) a second, collapsed attitude, in which said seat frame, leg members, and back frame are folded together, into substantial parallelism as a compact unit, and said tray projects outwardly from and substantially perpendicular to said unit.

8. A wheel and tray assembly, according to claim 7, wherein:

said axle has two wheels rotatably journalled thereon, at opposite ends thereof;

said brackets are rotatably mounted on said axle, intermediate said wheels; and said tray is intermediate said brackets.

9. A wheel and tray assembly, according to claim 7, wherein:

said brackets and said tray have mutually confronting surfaces; and said surfaces have means cooperative for detentingly maintaining said tray in a given attitude relative to said brackets.

* * * * *